United States Patent
Wanami

(10) Patent No.: US 7,460,939 B2
(45) Date of Patent: Dec. 2, 2008

(54) SYSTEM AND METHOD FOR DETECTING OCCUPANT

(75) Inventor: Shingo Wanami, Kariya (JP)

(73) Assignee: DENSO CORPORATION, Kariya (JP)

( * ) Notice: Subject to any disclaimer, the term of this patent is extended or adjusted under 35 U.S.C. 154(b) by 462 days.

(21) Appl. No.: 11/220,528

(22) Filed: Sep. 8, 2005

(65) Prior Publication Data
US 2006/0075834 A1    Apr. 13, 2006

(30) Foreign Application Priority Data
Sep. 28, 2004    (JP) .............................. 2004-281352

(51) Int. Cl.
G01G 19/12    (2006.01)
G06F 7/00    (2006.01)
(52) U.S. Cl. .............................. 701/45; 701/36; 180/273
(58) Field of Classification Search .................. None
See application file for complete search history.

(56) References Cited

U.S. PATENT DOCUMENTS

| | | | | |
|---|---|---|---|---|
| 4,464,725 A | * | 8/1984 | Briefer | 702/101 |
| 4,796,212 A | * | 1/1989 | Kitagawa | 702/101 |
| 6,070,115 A | * | 5/2000 | Oestreicher et al. | 701/45 |
| 6,076,853 A | * | 6/2000 | Stanley | 280/735 |
| 7,181,324 B2 | * | 2/2007 | Fischer et al. | 701/36 |
| 2002/0104367 A1 | * | 8/2002 | Lich et al. | 73/1.13 |
| 2002/0134167 A1 | | 9/2002 | Rainey et al. | |

FOREIGN PATENT DOCUMENTS

| | | |
|---|---|---|
| JP | A-62-53615 | 9/1987 |
| JP | A-2003-014564 | 1/2003 |

* cited by examiner

*Primary Examiner*—Michael J. Zanelli
(74) *Attorney, Agent, or Firm*—Posz Law Group, PLC

(57) ABSTRACT

An occupant detecting system includes a temperature sensor that sequentially detects temperatures at a fixed position, a plurality of weight sensors disposed at predetermined positions of a seat to respectively provide weight signals, an occupant ECU. The ECU estimates temperatures of the weight sensors based on the temperatures sequentially detected by the temperature sensor and temperature characteristic data of the weight sensors relative to temperatures detected by the temperature sensor and corrects the weight signals based on the estimated temperatures.

7 Claims, 5 Drawing Sheets

SYSTEM AND METHOD FOR DETECTING OCCUPANT

CROSS REFERENCE TO RELATED APPLICATION

The present application is based on and claims priority from Japanese Patent Application 2004-281352, filed Sep. 28, 2004, the contents of which are incorporated herein by reference.

BACKGROUND OF THE INVENTION

1. Field of the Invention

The present invention relates to a system that detects an occupant of a seat and sends a signal to an airbag system or a seatbelt pre-tensioning system.

2. Description of the Related Art

Such an occupant detecting system includes four weight sensors disposed at four corners of a seat and an ECU (electronic control unit). Because the output signals of the weight sensors are affected by temperature, it is necessary to remove temperature-affected-variation of the signals. US2002/0134167A1 discloses an occupant detecting system in which a temperature sensor is attached to each weight sensor to remove temperature-affected-variation. Therefore, four temperature sensors are necessary for four weight sensors, thereby resulting in a higher cost and a larger size of the occupant detecting system.

If the number of the weight sensors is reduced to reduce the cost and size, detection accuracy of the system may lower when the ambient temperature changes in a short time because the temperature of the four temperature sensors may differ one from another.

SUMMARY OF THE INVENTION

Therefore, an object of the invention is to provide an improved system for detecting an occupant at a higher accuracy with less number of temperature sensors.

Another object of the invention is to provide an improved method for detecting an occupant at a higher accuracy with less number of temperature sensors.

The inventor considered that irregular temperature distribution was caused by air-conditioned air passages and heat conductivities of seat components such as a seat frame and seat rails. The inventor found out a fact that temperatures of various positions of a seat are related to each other, so that a temperature of a certain position of the seat can be estimated by a temperature of another position of the seat.

According to an aspect of the invention, an occupant detecting system includes a temperature sensor that sequentially detects temperatures at a fixed position, a plurality of weight sensors for respectively providing weight signals, estimating means for estimating temperatures of the weight sensors based on the temperatures sequentially detected by the temperature sensor and previously stored temperature characteristic data of the weight sensors relative to temperatures detected by the temperature sensor and correcting means for correcting the weight signals based on the temperatures estimated by the estimating means.

In the above occupant detecting system, the estimating means may include first means for calculating a speed of changing temperature based on a temperature difference between two points of times and second means for calculating temperatures of the weight sensors based on the temperatures detected by the temperature sensor and the temperature characteristic data if the temperature difference is larger than a predetermined temperature, and the speed of changing temperature is higher than a predetermined speed. Further, the occupant detecting system may includes an occupant detecting ECU in which the estimating means and the correcting means are included. In the above occupant detecting system, the temperature sensor may be also included in the occupant detecting ECU. Preferably, the weight sensors are disposed at four corners of a seat, and the estimating means estimates a common temperature of the weight sensors disposed at two front corners of the seat and a common temperature of the weight sensors disposed at two rear corners of the seat.

Another aspect of the invention is a method of detecting an occupant of a seat. The method includes steps of sequentially detecting temperature of a fixed position, detecting weight of the seat at a plurality of positions of the seat by weight sensors respectively disposed at the plurality of positions, estimating temperatures of the weight sensors based on the temperatures sequentially detected by the temperature sensor and previously stored temperature characteristic data of the weight sensors relative to temperatures of the temperature sensor and correcting the weight signals based on the estimated temperatures.

BRIEF DESCRIPTION OF THE DRAWINGS

Other objects, features and characteristics of the present invention as well as the functions of related parts of the present invention will become clear from a study of the following detailed description, the appended claims and the drawings. In the drawings:

DETAILED DESCRIPTION OF THE PREFERRED EMBODIMENTS

An occupant detecting system 1 and a method for detecting an occupant according to a preferred embodiment of the invention will be described with reference to the appended drawings.

Figure 1:
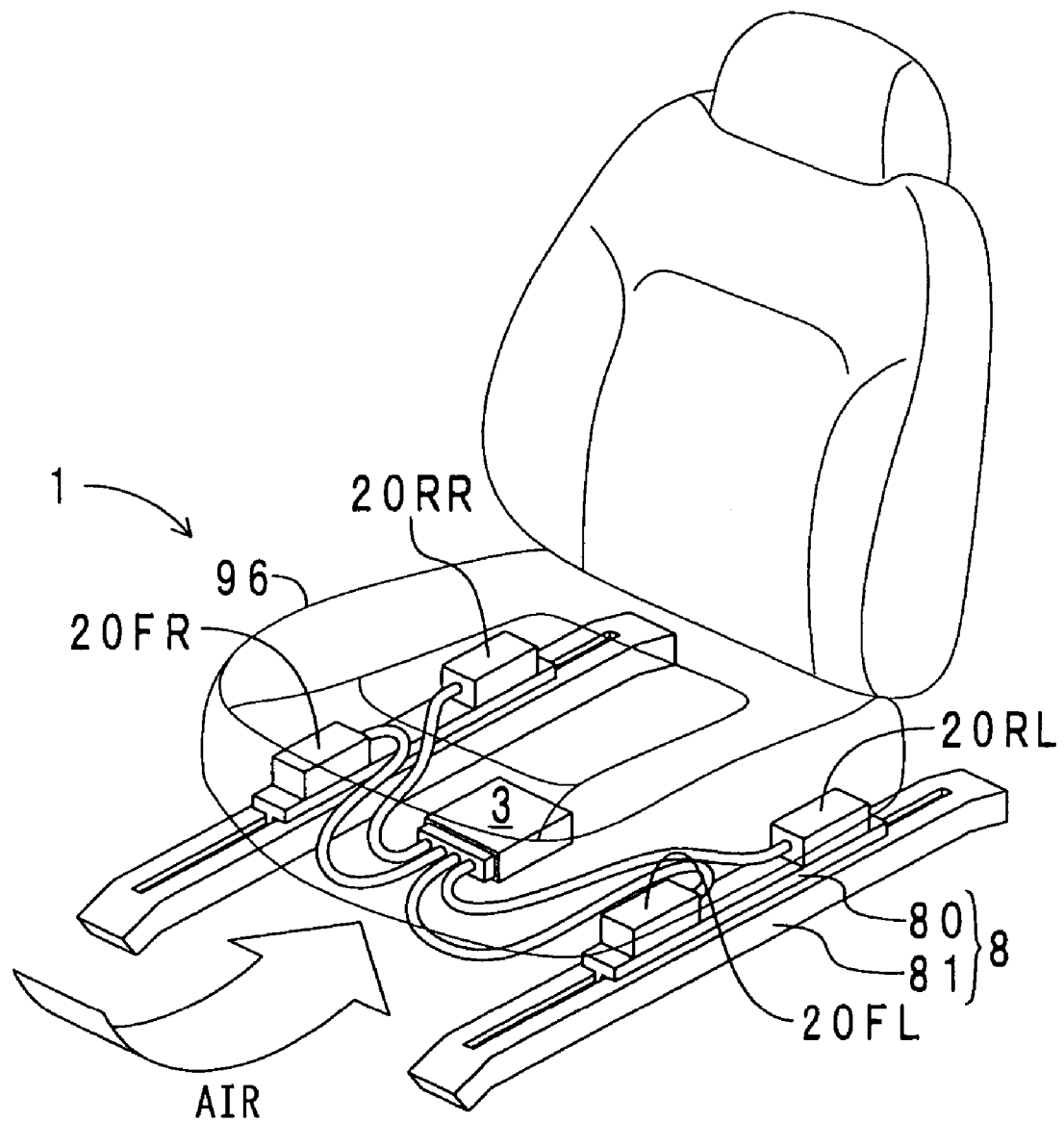
FIG. 1 is a schematic perspective view illustrating an occupant detecting system according to a preferred embodiment of the invention mounted in a vehicle seat.

As shown in FIG. 1, the occupant detecting system is mounted in the front passenger's seat 96 of a vehicle, which is disposed on a pair of seat rails 8. Each seat rail 8 is comprised of an upper rail 80 and a lower rail 81. The pair of seat rails 8 is fixed to the floor of a vehicle to line up in the transverse or width direction of the vehicle body. The upper rail 80 is slidably disposed on the lower rail 81 and fixed to the seat 96 so that the seat 96 can slide back and forth along the lower rail 81. The occupant detecting system 1 includes four weight sensors—a front right sensor 20FR, a front left sensor 20FL, a rear right sensor 20RR and a rear left sensor 20RL—and an occupant detecting ECU 3, which are electrically connected by wire harness.

The seat 96 has a seat frame (not shown), and the four weight sensors 20FR, 20FL, 20RR, 20RL are disposed at four corners of the seat 96—the front right corner, the front left corner, the rear right corner and the rear left corner—between the seat frame and the upper rail 80. Each weight sensor is a strain gage type sensor that includes a bridge circuit of four strain gages and an amplifier. The occupant detecting ECU 3 is fixed to the bottom of the seat 96 in the middle of the width thereof.

Figure 2:
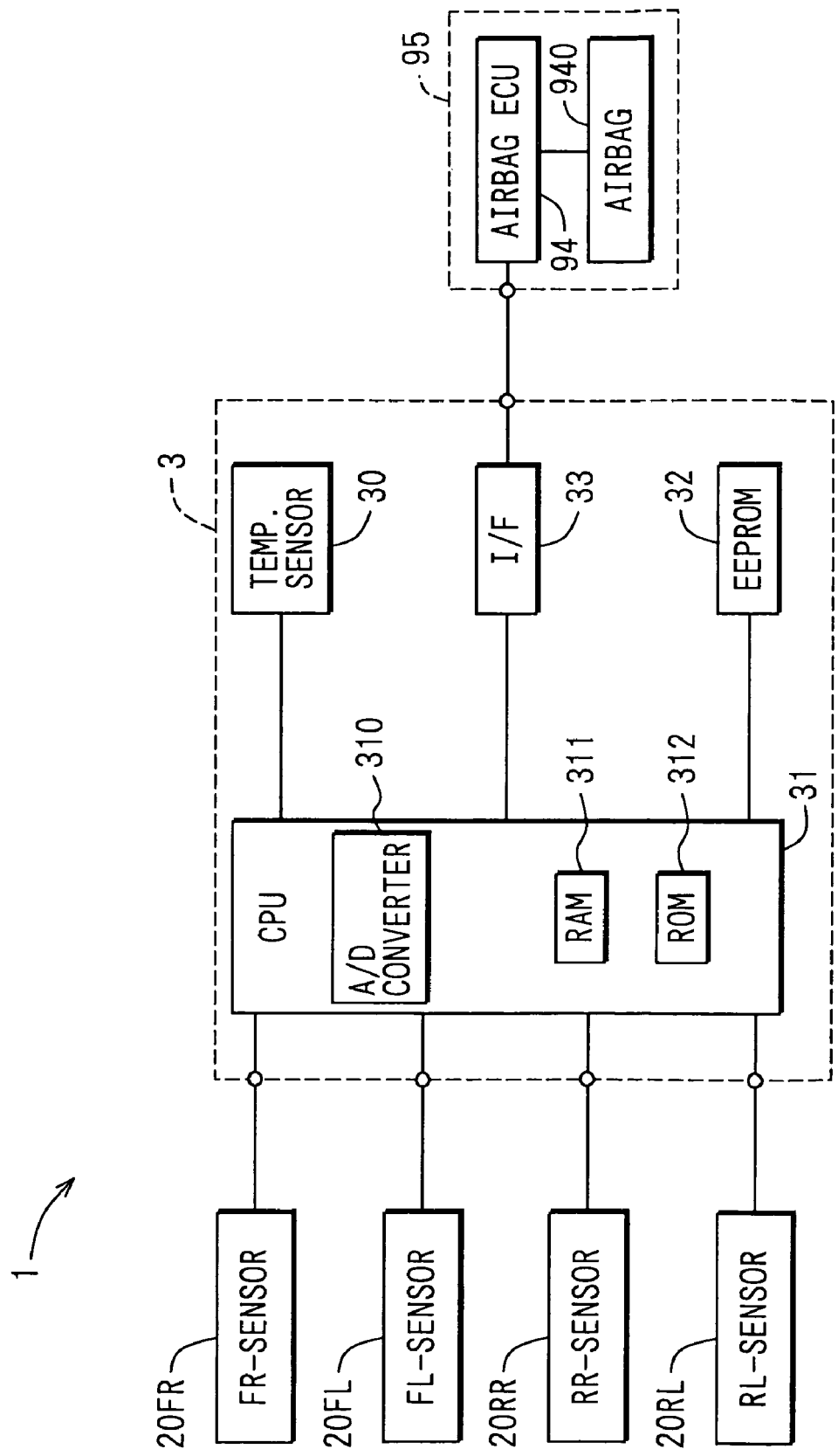
FIG. 2 is a block diagram showing components of the occupant detecting system.

As shown in FIG. 2, The occupant detecting ECU 3 includes a temperature sensor 30, a CPU (central processing unit) 31, an EEPROM 32 and a communication I/F (interface) 33. The CPU 31 functions as a temperature estimation unit, a temperature change judging unit and a weight signal correction unit. For this purpose, the CPU 31 includes an A/D converter 310, a RAM 311 and a ROM 312.

The A/D converter 310 converts analog voltage signals sent from the weight sensors 20FR, 20FL, 20RR, 20RL into digital data. The RAM 311 temporarily stores the digital data. The ROM 312 has stored a program for detecting an occupant, a threshold value for judging whether the seat is occupied or not and respective temperature characteristics of the weight sensors 20FR, 20FL, 20RR, 20RL. The EEPROM 32 stores data of failure if one of the weight sensors 20FR, 20FL, 20RR, 20RL fails. The communication I/F 33 sends the judgment data of the CPU 31 to an airbag ECU 94 of an airbag system 95. The airbag ECU 94 locks or unlocks an airbag 940 based on the judgment data.

The CPU 31 estimates temperature of the weight sensors 20FR, 20FL, 20RR, 20RL in the following manner.

Figure 3:
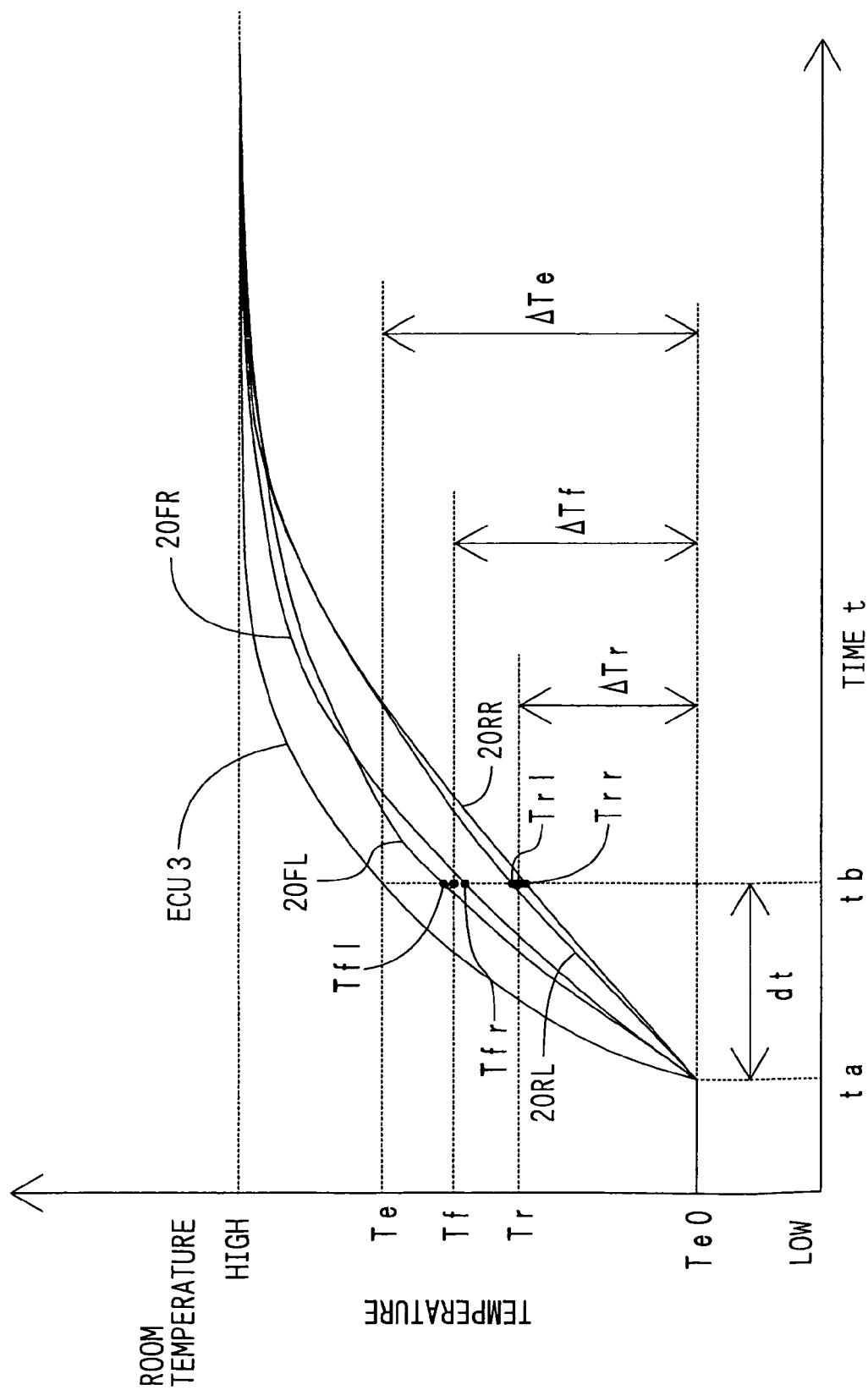
FIG. 3 is a graph showing temperature characteristics relative to time at various positions of the occupant detecting system.

If an air conditioner heats a passenger compartment in a short time, the temperatures of the occupant detecting ECU3 and the weight sensors 20FR, 20FL, 20RR, 20RL rise as shown in FIG. 3. Although all the members have the same temperature Te0 when the air conditioner starts heating at time ta, each member has a different temperature at time tb when time dt lapses. That is: the occupant detecting ECU 3 has a temperature Te (i.e. Teo+ΔTe); the weight sensor 20FR has a temperature Tfr; the weight sensor 20FL has a temperature Tfl; the weight sensor 20RR has a temperature Trr; and the weight sensor 20RL has a temperature Trl.

Although all the temperatures finally become the same temperature as the room temperature, there is the following relationship among the temperatures in a transient time: Te>Tfl>Tfr>Trl>Trr. Because warm air-conditioned air flows as indicated by an arrow in FIG. 1, the temperatures Tfl and Tfr of the front weight sensors 20FR, 20FL are almost the same, and the temperatures Trl and Trr of the rear weight sensors 20RR, 20RL are almost the same.

Accordingly, it is possible to set a common temperature Tf of the front sensors 20FR, 20FL and a common temperature Tr of the rear sensors 20 RR, 20RL as follows: Tf=(Tfr+Tfl)/2; and Tr=(Trr+Trl)/2. Then, it is possible to estimate Tf and Tr by the following expressions.

$$Tf=Te0+\Delta Tr=Te0+\alpha \cdot \Delta Te \quad [E1]$$

in which α is a variable that is proportional to 1/dt.

$$Tr=Te0+\Delta Tr=Te0+\beta \cdot \Delta Te \quad [E2]$$

in which β is a variable that is proportional to 1/dt.

These expressions can be also applied to estimation of Tf and Tr in case the air conditioner starts cooling. In this case, the temperature changes in the opposite direction along the curves shown in FIG. 3.

Figure 4A:
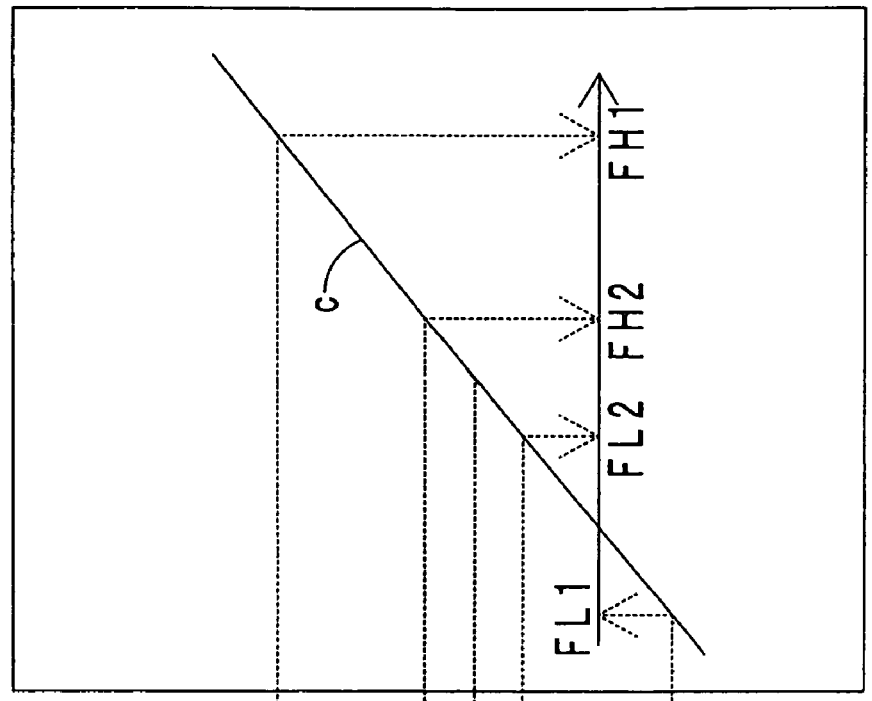
FIG. 4A is a graph showing estimated temperature changes.
Figure 4B:
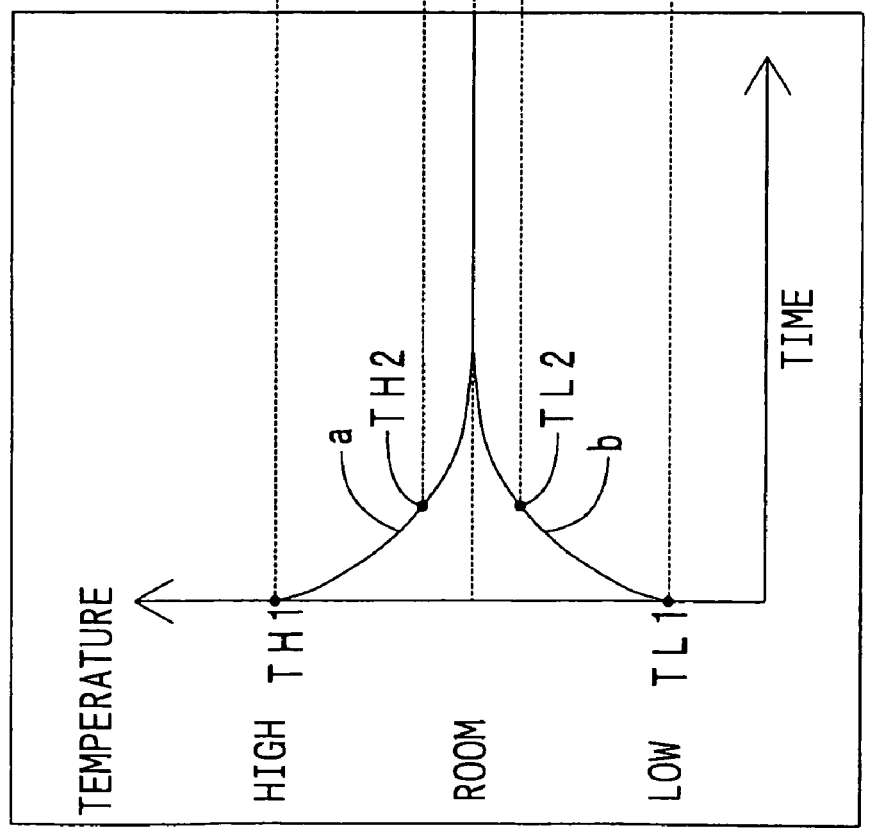
FIG. 4B is a graph showing a relationship between estimated temperatures and correction values of detected weights.

Weight signal correction of the weight sensor 20FR will be described below with reference to FIGS. 4A and 4B.

The temperature characteristic data of the weight sensor 20FR are stored beforehand in the ROM 312 as a matrix or an arithmetic expression. In FIG. 4A, line a represents a temperature change characteristic in a short time from a high temperature to a target room temperature, and line b represents a temperature change characteristic in a short time from a low temperature to a target room temperature.

For example, a weight correction value FL1 is calculated from an estimated temperature TL1 via a temperature characteristic line c. In the same manner, a weight correction value FL2 is calculated from an estimated temperature TL2, a weight correction value FH1 is calculated from an estimated temperature TH1, and a weight correction value FH2 is calculated from an estimated temperature TH2. Thus, the weight data are corrected. Weight data of the other weight sensors 20FL, 20RR and 20RL are also calculated in the same manner as above. The occupant detection is carried out by comparing the total sum of the corrected weight data of the four weight sensors 20FR, 20FL, 20RR, 20RL and an occupant detection reference value that is stored in the ROM 312.

Figure 5:
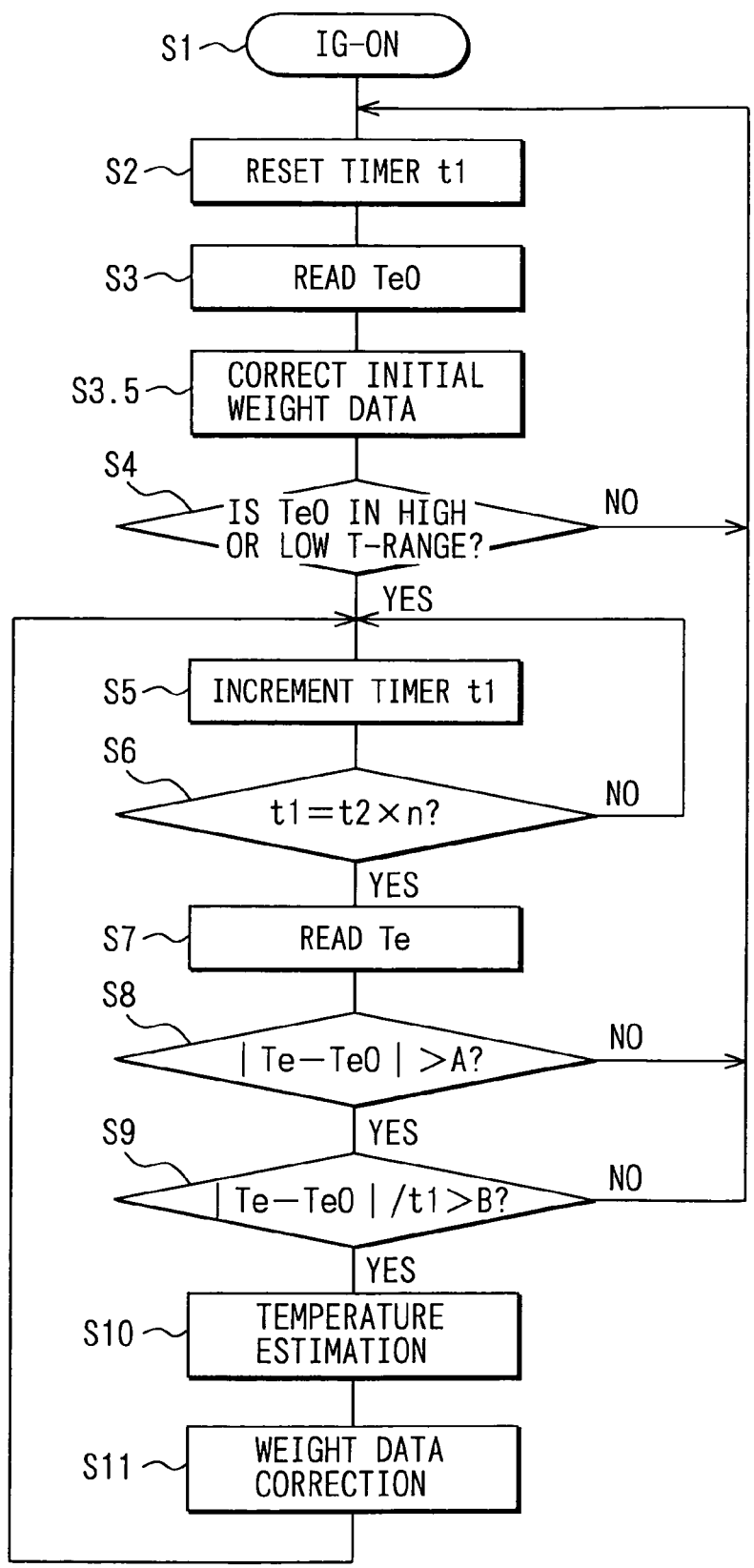
FIG. 5 is a flow diagram showing an algorism of the occupant detecting system.

The algorism of the occupant detecting system will be described below with reference to a flow diagram shown in FIG. 5.

When an ignition key is turned on at step Step S1, a timer t1 is reset at step S2. Then the initial temperature signal Te0 of the temperature sensor 30 is read at step S3. Subsequently, an initial weight data correction value to be used in case that the temperature of a passenger compartment (room temperature) is unchanged or out of high or low temperature range is set at step S3.5. This initial weight data correction value is set based on the initial temperature signal Te0 and temperature characteristics of the four weight sensors 20FR, 20FL, 20RR, 20RL, as shown in FIG. 4B. Thereafter, whether the initial temperature signal Te0 is in a low temperature range such as a temperature range lower than 15° C. or in a high temperature range such as a temperature range higher than 35° C. is examined at step S4. If the result is YES, the timer t1 is incremented at step S5. On the other hand, the timer t1 is reset again at step S2 if the result is NO. That is, either the temperature estimation at step S10 or the weight data correction at step S11 is not carried out if the initial temperature signal Te0 does not come in the low temperature range or in the high temperature range.

After the timer t1 is incremented at step S5, whether or not t1=t2×n is examined at step S6. If the result is YES, the temperature signal Te of the occupant detecting ECU 3 is read to replace the initial temperature signal Te0 at step S7. On the other hand, the timer t1 is reset again at step S2 if the result is NO. That is, the temperature signal Te is read and renewed each set time.

Thereafter, whether the difference between the renewed temperature signal Te and the initial temperature signal Te0 is larger than a reference value A or not is examined at step S8. If the result is YES, whether the speed of the temperature change, which is |Te−Te0|/t1, is higher than a reference value B or not is examined. On the other hand, the timer t1 is reset again at step S2 if the result is NO.

If the speed of the temperature change is higher than the reference value B and the examination result of the step S9 is YES, the temperature estimation is carried out at step S10 and the weight data correction is carried out at step S11. On the other hand, the timer t1 is reset again at step S2 if the result is NO.

At step S10, the common temperatures Tf and Tr are calculated by means of the expressions E1 and E2. At step S11, the weight data correction is carried out in the manner described above with reference to FIGS. 4A and 4B. The temperature Tf or Tr is substituted by TH1 or TH2 if it is higher than a target room temperature and by TL1 or TL2 if it is lower than the initial room temperature.

After the weight data correction is carried out, the timer t1 is incremented at step S5. Thereafter, the above described steps S5-S11 are repeatedly carried out.

The weight data correction may be made by changing the threshold value of the ROM 312 according to the temperature estimation. The temperature characteristics of the weight sensors 20FR, 20FL, 20RR, 20RL may be stored in the EEPROM 32 instead of ROM 312.

Another temperature sensor of the same type may be added to the temperature sensor 30, so that one of them detects temperature corresponding to the front weight sensors 20FR, 20FL and so that the other detects temperature corresponding to the rear weight sensors 20RR, 20RL. Further, the temperature sensor 30 may be disposed at a position that is separated from the occupant detecting ECU 3.

The occupant detecting system may be located at the driver's seat or a rear seat instead of the front passenger's seat.

In the foregoing description of the present invention, the invention has been disclosed with reference to specific embodiments thereof. It will, however, be evident that various modifications and changes may be made to the specific embodiments of the present invention without departing from the scope of the invention as set forth in the appended claims. Accordingly, the description of the present invention is to be regarded in an illustrative, rather than a restrictive, sense.

What is claimed is:

1. An occupant detecting system comprising:
a temperature sensor that sequentially detects temperatures at a fixed position;
a plurality of weight sensors, disposed at predetermined positions of a seat, for respectively providing weight signals;
storing means for storing temperature characteristic data of said weight sensors relative to temperatures;
estimating means for estimating temperatures of said weight sensors based on the temperatures sequentially detected by said temperature sensor and said temperature characteristic data of said weight sensors relative to temperatures detected by said temperature sensor;
correcting means for correcting the weight signals based on the temperatures estimated by said estimating means; and
an occupant detecting ECU that carries out an occupant detection according to the corrected weight signals corrected by said correcting means,
wherein said estimating means comprises:
first means for calculating a speed of changing temperature based on a temperature difference between two points of times; and
second means for calculating temperatures of said weight sensors based on the temperatures detected by said temperature sensor and the temperature characteristic data if the temperature difference is larger than a predetermined temperature, and the speed of changing temperature is higher than a predetermined speed.

2. The occupant detecting system as claimed in claim 1, wherein said estimating means and said correcting means are included in said occupant detecting ECU.

3. The occupant detecting system as claimed in claim 2, wherein said temperature sensor is included in said occupant detecting ECU.

4. The occupant detecting system as claimed in claim 1, wherein said weight sensors are disposed at four corners of a seat.

5. The occupant detecting system as claimed in claim 4, wherein said estimating means estimates a common temperature of said weight sensors disposed at two front corners of the seat and a common temperature of said weight sensors disposed at two rear corners of the seat.

6. A seat occupant detecting system comprising:
a temperature sensor for sequentially detecting temperatures of a fixed position;
a plurality of weight sensors, disposed at predetermined positions of a seat, for respectively providing weight signals; and
an occupant detecting ECU including said temperature sensor, a ROM that stores temperature characteristic data of said weight sensors relative to temperatures detected by said temperature sensor, estimating means for estimating temperatures of said weight sensors based on the temperatures sequentially detected by said temperature sensor and the temperature characteristic data, and correcting means for correcting the weight signals based on the temperatures estimated by said estimating means,
wherein:
said occupant detecting ECU carries out an occupant detection according to the corrected weight signals corrected by said correcting means; and
said estimating means comprises first means for calculating a speed of changing temperature based on a temperature difference between two points of times; and second means for calculating temperatures of said weight sensors based on the temperatures detected by said temperature sensor and the temperature characteristic data if the temperature difference is larger than a predetermined temperature, and the speed of changing temperature is higher than a predetermined speed.

7. A method of detecting an occupant of a seat comprising the steps of:
sequentially detecting temperature of a fixed position;
detecting weight of the seat at a plurality of positions of the seat by weight sensors respectively disposed at the plurality of positions;
estimating temperatures of said weight sensors based on the temperatures sequentially detected by said temperature sensor and temperature characteristic data of said weight sensors relative to temperatures of said temperature sensor;
correcting the weight signals based on the estimated temperature; and
carrying out an occupant detection according to the corrected weight signals,
wherein said estimating temperatures comprises:
calculating a speed of changing temperature based on a temperature difference between to points of times; and
calculating temperatures of said weight sensors based on the temperatures detected by said temperature sensor and the temperature characteristic data if the temperature difference is larger than a predetermined temperature, and the speed of changing temperature is higher than a predetermined speed.

* * * * *